US012633769B2

(12) United States Patent
Masui

(10) Patent No.: US 12,633,769 B2
(45) Date of Patent: May 19, 2026

(54) POWER SUPPLY CONTROL CIRCUIT

(71) Applicant: Yazaki Corporation, Tokyo (JP)

(72) Inventor: Hideaki Masui, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/934,420

(22) Filed: Nov. 1, 2024

(65) Prior Publication Data

US 2025/0062638 A1 Feb. 20, 2025

Related U.S. Application Data

(63) Continuation of application No. PCT/JP2023/035852, filed on Oct. 2, 2023.

(30) Foreign Application Priority Data

Nov. 4, 2022 (JP) ................................. 2022-177101

(51) Int. Cl.
*H02J 9/06* (2006.01)
*H02J 105/37* (2026.01)

(52) U.S. Cl.
CPC ........... *H02J 9/061* (2013.01); *H02J 2105/37* (2026.01)

(58) Field of Classification Search
CPC ..... H02J 9/061; H02J 9/06; H02J 7/34; B60L 3/04; B60R 16/02; B60R 16/033
See application file for complete search history.

(56) References Cited

U.S. PATENT DOCUMENTS

| | | | |
|---|---|---|---|
| 2002/0190690 A1* | 12/2002 | Tamai | B60L 1/00 |
| | | | 903/903 |
| 2008/0150483 A1 | 6/2008 | Morita et al. | |
| 2019/0173274 A1* | 6/2019 | Fukae | H01M 10/44 |
| 2019/0260225 A1 | 8/2019 | Hida et al. | |
| 2019/0312456 A1* | 10/2019 | Iwasaki | B60L 1/10 |
| 2020/0343763 A1 | 10/2020 | Wataru | |
| 2021/0237670 A1* | 8/2021 | Takahara | B60R 16/033 |
| 2023/0420981 A1* | 12/2023 | Nagatomi | B60L 3/04 |
| 2025/0219401 A1* | 7/2025 | Takeya | H02J 7/0047 |

FOREIGN PATENT DOCUMENTS

| | | |
|---|---|---|
| JP | 2012-135206 A | 7/2012 |
| JP | 2019-146305 A | 8/2019 |
| JP | 2020-182318 A | 11/2020 |
| WO | 2022/114197 A1 | 6/2022 |

* cited by examiner

*Primary Examiner* — Rexford N Barnie
*Assistant Examiner* — Rasem Mourad
(74) *Attorney, Agent, or Firm* — Sughrue Mion, PLLC

(57) ABSTRACT

A power supply control circuit that allows the power to be supplied from a power supply such as a sub-battery to a load for a longer period of time, in the event of a failure of a main power supply. The power supply control circuit (1) includes: a first circuit (2) connecting a main battery (52) and a sub-battery (53) via a DC/DC converter (20); a second circuit (3) connecting a main battery (52) and a load (54); and a third circuit (4) connecting the sub-battery (53) and a load (54) via a semiconductor switch (32). When the main battery (52) fails, the semiconductor switch (32) is turned ON to supply the power from the sub-battery (53) to the load (54), and the forward direction of a parasitic diode (32a) of the semiconductor switch (32) is a direction from the load (54) to the sub-battery (53). Furthermore, the DC/DC converter (20) boosts the voltage from the main battery (52) and supplies the boosted voltage to the sub-battery (53).

6 Claims, 4 Drawing Sheets

POWER SUPPLY CONTROL CIRCUIT

TECHNICAL FIELD

The present invention relates to a power supply control circuit that controls, for example, a battery of a vehicle. The present application is a continuation application of International Application No. PCT/JP2023/035852, filed on Oct. 2, 2023, claiming priority to Japanese Patent Application No. 2022-177101, filed on Nov. 4, 2022. The entire contents of the foregoing International Application and Japanese Patent Application are incorporated herein by reference.

BACKGROUND

For example, in a vehicle such as an automobile, not only a main battery but also a sub-battery may be installed as an on-board power source. With this configuration, when the main battery cannot supply power to important loads due to a malfunction of the main battery, the sub-battery can supply power instead of the main battery.

For example, the Patent Document 1 discloses a system that includes a first switch connected between a main power source and loads, a second switch connected between a sub-battery and the loads, and a backflow prevention circuit that prevent current backflow between the main power source and the sub-battery, wherein the polarity of the backflow prevention circuit is devised so as to allow a current to pass in a direction from the sub-power source to the loads even when the second switch is in an OFF state.

RELATED ART

Patent Document

Patent Document 1: JP2020182318A

SUMMARY OF THE INVENTION

Problem to be Solved by the Invention

Incidentally, it is known that a circuit connecting a sub-battery and a load can be switched by a semiconductor switch as in Patent Document 1. In addition, this semiconductor switch may be configured with back-to-back FETs (field effect transistors). A specific example is described with reference to FIG. 4.

A power supply control circuit 100 illustrated in FIG. 4 is connected to an alternator 51 that generates power and outputs DC power when the vehicle is in operation, a main battery 52 that is the main power source, a sub-battery 53 that supplies power to a load 54 in the event of a failure of the main battery, and the load 54.

The power supply control circuit 100 includes an interrupter circuit 10, a DC/DC converter 20, and semiconductor switches 101, 102. The interrupter circuit 10 includes a voltage detection unit 11 and semiconductor switches 12, 13. The voltage detection unit 11 monitors the voltage supplied from the main battery 52, and when a failure is detected, controls the semiconductor switches 12, 13 to cut off the electrical connection between the power supply control circuit 100 and the main battery 52. The load 54 is connected to the downstream stage of the interrupter circuit 10, and is, during normal operations, supplied with power from the main battery 52 via the path indicated by the arrow A11.

The DC/DC converter 20 converts the power from the main battery 52 into a predetermined DC voltage and supplies it to the sub-battery 53 to charge the sub-battery 53. The semiconductor switches 101, 102 are composed of MOSFETs (metal oxide semiconductor field effect transistors). The semiconductor switches 101, 102 are connected between the sub-battery 53 and the load 54 and are off during normal operations, but are turned ON when the main battery 52 fails so that power is supplied from the sub-battery 53 to the load 54 (see arrow A12).

In the circuit illustrated in FIG. 4, the semiconductor switch 101 and the semiconductor switch 102 are connected back-to-back to prevent a reverse current flow during normal operations when a current is applied from the main battery 52.

As described above, when the power is supplied from the sub-battery 53, the current passes through the semiconductor switches 101 and 102. In this case, a voltage drop equivalent to that of two MOSFETs is applied to the load 54. The voltage of the battery decreases as power is supplied (discharged). Therefore, there is a risk that the time during which the load 54 can operate, that is, the time during which the power is supplied from the sub-battery 53 to the load 54, may become shorter than expected due to the voltage drop caused by the semiconductor switches 101, 102.

In view of the above problems, it is an object of the present invention to provide a power supply control circuit that allows the power to be supplied from a power source such as a sub-battery to a load for a longer period of time, in the event of a failure of a main power source.

Solution to Problem

The invention made to solve the above problems is a power supply control circuit that includes a first circuit connecting a first battery and a second battery via a DC/DC converter, a second circuit connecting the first battery and a first load, and a third circuit connecting the second battery and a first load via a first semiconductor switch, wherein when the first battery fails, the first semiconductor switch is turned ON to supply power from the second battery to the first load, a forward direction of a parasitic diode of the first semiconductor switch is a direction from the first load to the second battery, and the DC/DC converter boosts a voltage from the first battery and supplies the boosted voltage to the second battery.

Advantageous Effects

According to the present invention, the third circuit, which connects the second battery and the first load, is connected only via the first semiconductor switch, which reduces voltage drop as compared to a back-to-back connection and allows the power to be supplied from the power source such as the sub-battery to the load for a longer period of time in the event of a failure of the main power source.

DETAILED DESCRIPTION OF THE
EXEMPLARY EMBODIMENT

Figure 1:
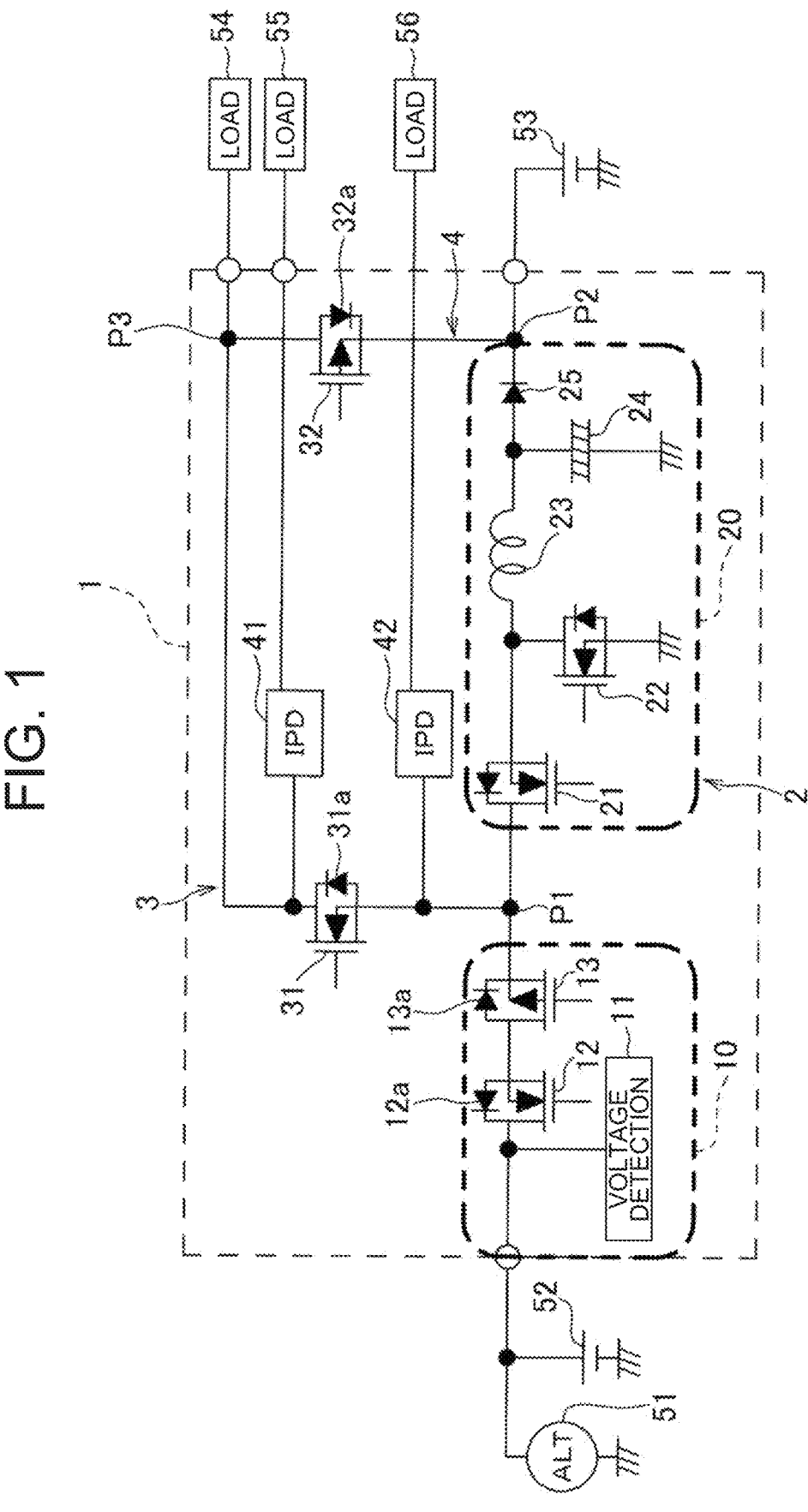
FIG. 1 is a circuit diagram of a power supply control circuit according to one embodiment of the present invention.
Figure 4:
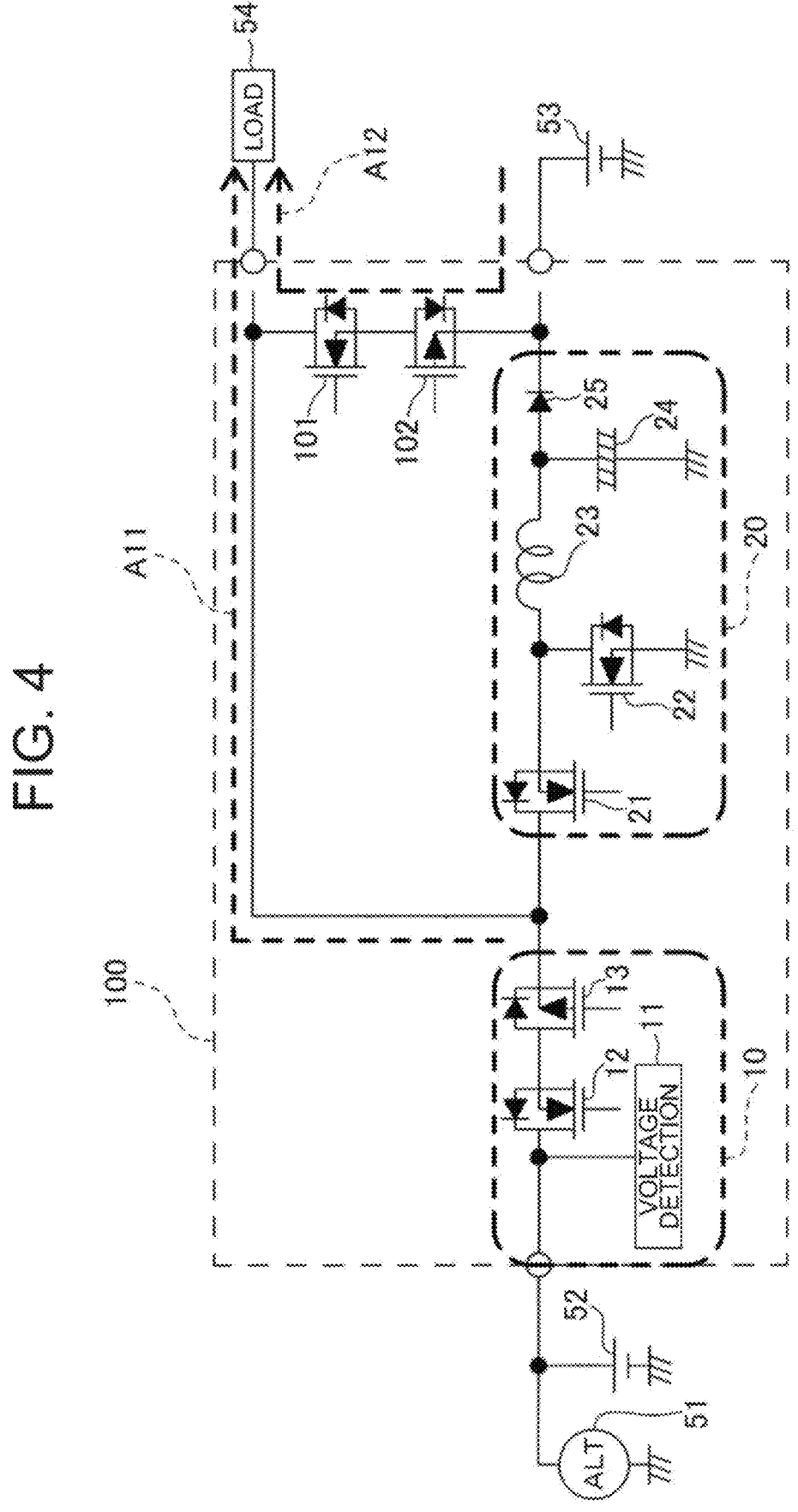
FIG. 4 is an example of a conventional power supply control circuit.

An embodiment of the present invention is described below with reference to the drawings. FIG. 1 is a circuit diagram of a power supply control circuit according to one embodiment of the present invention. Note that the same elements and devices as those in FIG. 4 are indicated by the same reference numerals.

The power supply control circuit 1 is mounted on, for example, a vehicle. The vehicle according to the present embodiment is, for example, an electrically powered vehicle such as an electric vehicle or a hybrid vehicle.

As illustrated in FIG. 1, the power supply control circuit 1 is connected to an alternator 51 that outputs DC power supply power, a main battery 52 that is a main power supply, a sub-battery 53 that supplies power to the load 54 when the main battery fails, and loads 54, 55, and 56. That is, the main battery 52 functions as the first battery, and the sub-battery 53 functions as the second battery.

The power supply control circuit 1 includes an interrupter circuit 10, a DC/DC converter 20, semiconductor switches 31, 32, and IPDs 41, 42.

The interrupter circuit 10 includes a voltage detection unit 11 and semiconductor switches 12, 13. The voltage detection unit 11 monitors the voltage supplied from the main battery 52, and when a failure is detected, the voltage detection unit 11 controls the semiconductor switches 12, 13 to cut off the electrical connection between the power supply control circuit 1 and the main battery 52.

The semiconductor switches 12, 13 are each formed of, for example, a MOSFET. In the circuit illustrated in FIG. 1, the semiconductor switch 12 is formed of an n-channel MOSFET, and the semiconductor switch 13 is formed of a p-channel MOSFET.

The semiconductor switches 12, 13 are connected in a state in which the forward direction of the parasitic diode 12a of the semiconductor switch 12 and the forward direction of the parasitic diode 13a of the semiconductor switch 13 are arranged in the opposite directions to each other. That is, the source terminal of the semiconductor switch 12 and the source terminal of the semiconductor switch 13 are connected to each other. The drain terminal of the semiconductor switch 12 is connected to the main battery 52, and the drain terminal of the semiconductor switch 13 is connected to the DC/DC converter 20 and the semiconductor switch 31. That is, the semiconductor switches 12, 13 are connected back-to-back.

During normal operations in which electricity is supplied from the main battery 52 to the alternator 51, the semiconductor switches 12, 13 are in the ON state to supply electricity to the DC/DC converter 20, the semiconductor switch 31, and the like on the downstream, but if the voltage detection unit 11 detects that the main battery 52 has failed due to an abnormality or the like, the semiconductor switches 12, 13 are turned OFF to cut off the electricity to the DC/DC converter 20, the semiconductor switch 31, and the like on the downstream.

The DC/DC converter 20 boosts the power from the main battery 52 and supplies the power to the sub-battery 53 to charge the sub-battery 53. The DC/DC converter 20 includes MOSFETs 21, 22, a coil 23, a capacitor 24, and a diode 25. The DC/DC converter 20 supplies, to the sub-battery 53, a voltage that is higher than the DC voltage supplied from the main battery 52, thereby making the charging voltage of the sub-battery 53 higher than that of the main battery 52.

The semiconductor switch 31 is, for example, configured with a MOSFET. In the circuit of FIG. 1, the semiconductor switch 31 is configured with an n-channel MOSFET. The semiconductor switch 31 is connected between the load 54 and a connection point P1 that is on the wiring between the interrupter circuit 10 and the DC/DC converter 20. In other words, the source terminal of the semiconductor switch 31 is connected to the interrupter circuit 10 side (the connection point P1), and the drain terminal of the semiconductor switch 31 is connected to the load 54. Therefore, the parasitic diode 31a of the semiconductor switch 31 is connected so that the direction from the interrupter circuit 10 toward the load 54 is the forward direction.

During normal operations, the semiconductor switch 31 is in an ON state to pass current from the main battery 52 to the load 54 and the like on the downstream. When the voltage detection unit 11 detects that the main battery 52 has failed, the semiconductor switch 31 is turned OFF. That is, the semiconductor switch 31 functions as a second semiconductor switch that connects the main battery 52 (first battery) and the load 54 (first load).

The semiconductor switch 32 is composed of, for example, a MOSFET. In the circuit of FIG. 1, the semiconductor switch 32 is composed of a p-channel MOSFET. The semiconductor switch 32 is connected a connection point P2 and a connection point P3, the connection point P2 being on the wiring between the DC/DC converter 20 and a connection terminal to the sub-battery 53, and the connection point P3 being on the wiring with the load 54. That is, the source terminal of the semiconductor switch 32 is connected to the sub-battery 53 side (connection point P2), and the drain terminal is connected to the load 54 (connection point P3). Therefore, a parasitic diode 32a of the semiconductor switch 32 is connected such that the direction from the load 54 to the sub-battery 53 is the forward direction.

The semiconductor switch 32 is turned OFF during normal operations, and when the voltage detection unit 11 detects that the main battery 52 has failed, the semiconductor switch 32 is turned ON to supply power from the sub-battery 53 to the load 54 and the like. In other words, the semiconductor switch 32 functions as the first semiconductor switch.

The IPDs 41, 42 are an abbreviation for Intelligent Power Device, and are elements that integrate a highly durable semiconductor switch and various protection/diagnosis circuits in one package. The IPDs 41, 42 are also referred to as semiconductor relays. Whether to provide the IPDs 41, 42 is optional and does not have to be provided.

The IPD 41 is provided in the downstream stage of the semiconductor switch 31 and is connected to the load 55 to protect the load 55 from overcurrent and he like. The IPD 42 is provided in the upstream stage (the main battery 52 side) of the semiconductor switch 31 and is connected to the load 56 to protect the load 56 from overcurrent and the like. That is, the IPD 42 is connected to the load 56 (second load) in the upstream stage of the semiconductor switch 31 (the second semiconductor switch), and the IPD 42 (protective element) is connected in the upstream stage of the load 56.

The above-mentioned semiconductor switches, IPDs, and the like are controlled by a control unit (not illustrated) or the like that is provided separately and acquires the detection results of the voltage detection unit 11.

In the configuration of FIG. 1, a circuit from the connection point P1 to the connection point P2 (i.e., the DC/DC converter 20) forms a first circuit 2 that connects the main battery 52 (first battery) and the sub-battery 53 (second battery) via the DC/DC converter 20. A circuit from the connection point P1 to the connection point P3 forms a second circuit 3 that connects the main battery 52 (first battery) and the load 54 (first load). A circuit from the connection point P2 to the connection point P3 forms a third circuit 4 that connects the sub-battery 53 (second battery) and the load 54 (first load) via the semiconductor switch 32 (first semiconductor switch).

The interrupter circuit 10 is connected between the main battery 52 (first battery) and the first circuit 2/the second circuit 3.

Figure 2:
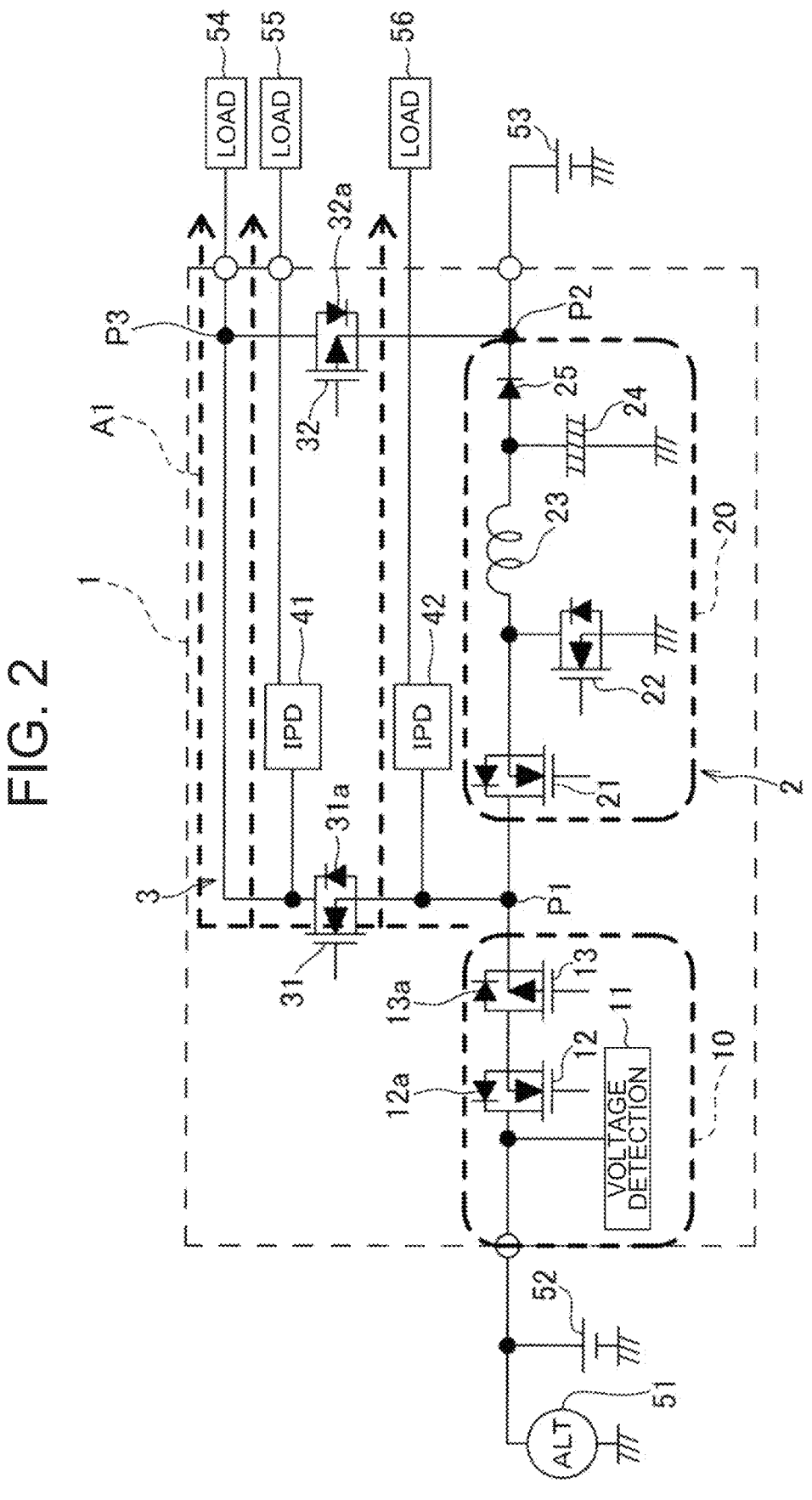
FIG. 2 is a diagram illustrating current flows in the circuit illustrated in FIG. 1 under normal operations.
Figure 3:
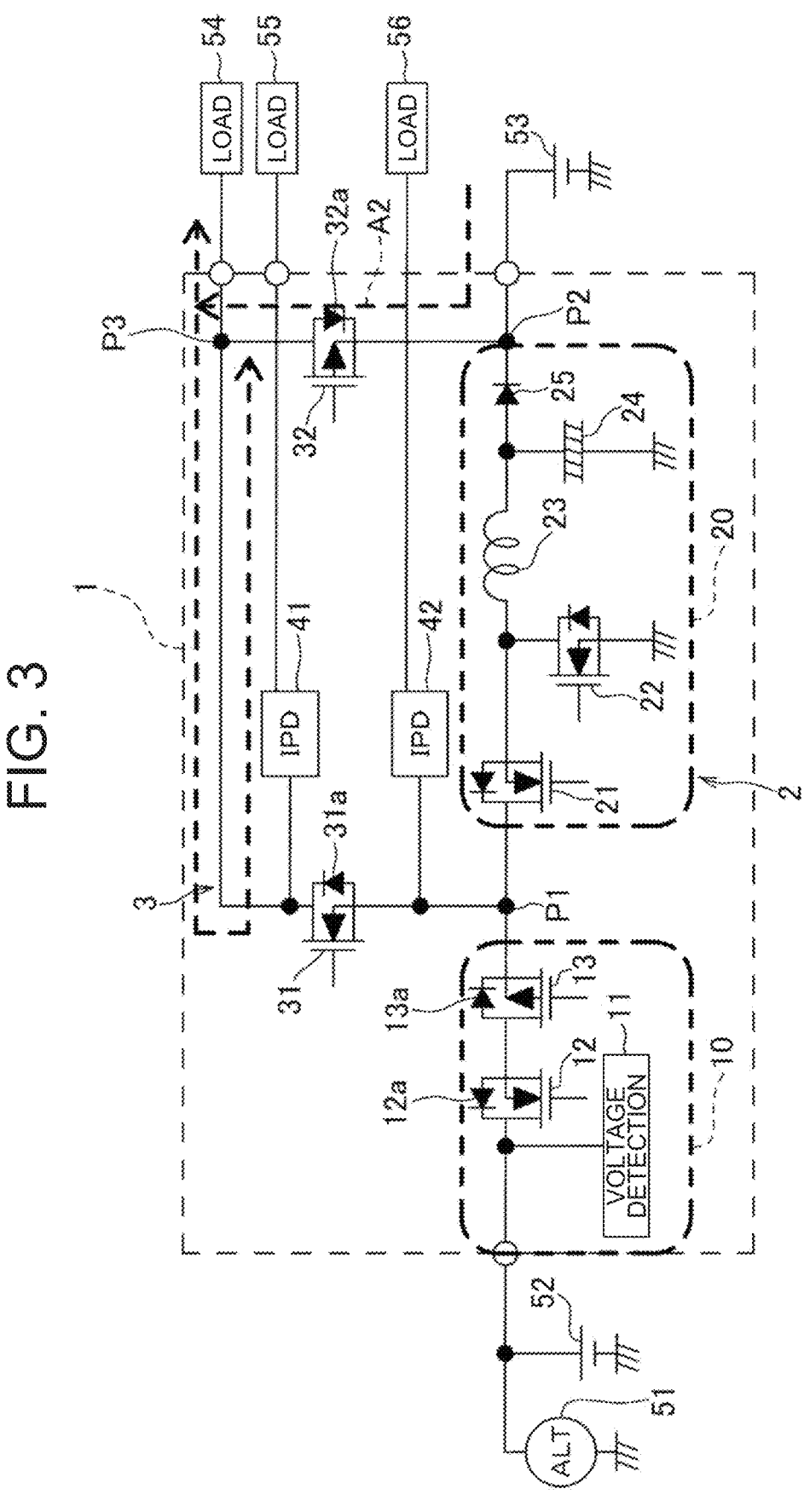
FIG. 3 is a diagram illustrating current flows in the circuit illustrated in FIG. 1 upon power failure.

Next, the operation of the power supply control circuit 1 having the above-described configuration is described with reference to FIGS. 2 and 3. FIG. 2 is a diagram illustrating current flows in the circuit illustrated in FIG. 1 under normal operations. FIG. 3 is a diagram illustrating current flows in the circuit illustrated in FIG. 1 upon power failure.

During normal operations as illustrated in FIG. 2, the semiconductor switch 31 is turned ON and the semiconductor switch 32 is turned OFF. The IPDs 41, 42 are in an ON state. Then, the power is supplied to each of the loads 54, 55, 56 from the main battery 52 and the alternator 51 (arrow A1). Meanwhile, the sub-battery 53 is charged by the boosted voltage from the DC/DC converter 20. Also, because the semiconductor switch 32 is in the OFF state, the power is not supplied from the sub-battery 53 to the load 54.

During normal operations, a voltage drop occurs due to the semiconductor switch 31. However, because the alternator 51 is connected, the main battery 52 is constantly charged. Therefore, there is almost no drop in the output voltage due to the discharge of the main battery 52, and the voltage supplied to the load 54 does not drop below the operating voltage.

In contrast, in the event of a power failure such as an abnormality in the main battery 52 illustrated in FIG. 3, the semiconductor switch 31 is turned OFF and the semiconductor switch 32 is turned ON. Then, the power is supplied to the load 54 from the sub-battery 53 (arrow A2). Meanwhile, the interrupter circuit 10 turns OFF the semiconductor switches 12, 13, cutting off the electrical connection with the main battery 52. Therefore, the charging operation from the DC/DC converter 20 to the sub-battery 53 also stops.

Although the semiconductor switch 31 is turned OFF, the load 55 is connected to the downstream stage of the semiconductor switch 31, and therefore the power supply from the sub-battery 53 becomes possible when the semiconductor switch 32 is turned ON (arrow A2). The load 56 is connected to the upstream stage of the semiconductor switch 31 (the connection point P1 side), and therefore the load 56 is not electrically connected to the sub-battery 53 and is no longer supplied with power.

According to the present embodiment, the power supply control circuit 1 includes the first circuit 2 that connects the main battery 52 and the sub-battery 53 via the DC/DC converter 20, the second circuit 3 that connects the main battery 52 and the load 54, and the third circuit 4 that connects the sub-battery 53 and the load 54 via the semiconductor switch 32. When the main battery 52 fails, the semiconductor switch 32 is turned ON to supply power from the sub-battery 53 to the load 54, and the forward direction of the parasitic diode 32a of the semiconductor switch 32 is a direction from the load 54 to the sub-battery 53. Furthermore, the DC/DC converter 20 boosts the voltage from the main battery 52 and supplies the boosted voltage to the sub-battery 53.

By configuring the power supply control circuit 1 as described above, the sub-battery 53 and the load 54 are connected only via the semiconductor switch 32 in the third circuit 4, so that the voltage drop can be reduced to about half the voltage drop of a back-to-back connection, and the power can be supplied from the sub-battery 53 to the load 54 for a longer period of time. In addition, because the power can be supplied for a longer period of time in the present embodiment, this realizes a configuration that is effective for continuing the system when a power source fails, which is a requirement for automatic driving, for example.

In addition, the forward direction of the parasitic diode 32a of the semiconductor switch 32 is a direction from the load 54 to the sub-battery 53, and the DC/DC converter 20 boosts the voltage from the main battery 52 and supplies the boosted power to the sub-battery 53. Therefore, the charging voltage of the sub-battery 53 is higher than that of the main battery 52, and this can prevent a current from flowing through the parasitic diode 32a during normal operations.

In addition, the second circuit 3 has the semiconductor switch 31 that connects the main battery 52 and the load 54, and the semiconductor switch 31 is turned OFF when the main battery 52 fails, and the forward direction of the parasitic diode 31a of the semiconductor switch 31 is a direction from the main battery 52 to the load 54. In this manner, when the main battery 52 fails, the electrical connection between the main battery 52 and the load 54 can be cut off even if there is a malfunction in the interrupter circuit 10.

In addition, the second circuit 3 is connected to the load 56 in the upstream stage of the second semiconductor switch. This makes it possible to electrically disconnect the loads that do not need to be driven by the sub-battery 53. This makes it possible to separate the loads that need to be driven by the sub-battery 53 from the loads that do not need to be driven by the sub-battery 53. As a result, only the necessary loads are driven by the sub-battery 53, reducing power consumption and allowing the power to be supplied for a longer period of time.

In addition, the IPD 42 may be provided in the upstream stage of the load 56. In this case, the load 56 can be protected from overcurrent and the like.

In addition, the interrupter circuit 10 that cuts off the power supply from the main battery 52 in the event of a failure of the main battery 52 is connected between the main battery 52 and the first circuit 2/the second circuit 3. In this case, the power supply from the main battery 52 can be cut off when the main battery 52 fails, e.g., when an abnormality occurs in the main battery 52.

The present invention is not limited to the above-described embodiment. In other words, a person skilled in the art can implement the present invention by modifying the present invention in various ways according to the conventionally known knowledge without departing from the gist of the present invention. As long as the power supply control circuit of the present invention is still provided even after such modification, it is of course included in the scope of the present invention.

LIST OF REFERENCE SIGNS

1 power supply control circuit
2 first circuit
3 second circuit
4 third circuit
10 interrupter circuit
20 DC/DC converter
31 semiconductor switch (second semiconductor switch)
32 semiconductor switch (first semiconductor switch)
42 IPD (protective element)

52 main battery (first battery)
53 sub-battery (second battery)
54 load
56 load

What is claimed is:

1. A power supply control circuit comprising:
a first circuit connecting a first battery and a second battery via a DC/DC converter;
a second circuit connecting the first battery and a first load; and
a third circuit connecting the second battery and the first load via a first semiconductor switch, with the second battery and a first terminal of the first semiconductor switch both electrically connected directly to a first electrical node of the third circuit, and with a second terminal of the first semiconductor switch and the first load both electrically connected directly to a second electrical node of the third circuit,
wherein the first semiconductor switch is constituted by a single transistor, and when the first battery fails, the first semiconductor switch is turned ON to supply power from the second battery to the first load,
a forward direction of a parasitic diode of the transistor constituting the first semiconductor switch is a direction from the first load to the second battery,
the DC/DC converter boosts a voltage from the first battery and supplies the boosted voltage to the second battery,
the second circuit includes a second semiconductor switch connecting the first battery and the first load,
the second semiconductor switch is turned OFF when the first battery fails,
a forward direction of a parasitic diode of the second semiconductor switch is a direction from the first battery to the first load, a terminal of the second semiconductor switch is electrically connected directly to the second electrical node,
the terminal of the second semiconductor switch is a first terminal of the second semiconductor switch,
a second terminal of the second semiconductor switch and a first terminal of the DC/DC converter are both electrically connected directly to a third electrical node, and
a second terminal of the DC/DC converter is electrically connected directly to the first electrical node.

2. The power supply control circuit according to claim 1, wherein the second circuit is connected to a second load in an upstream stage of the second semiconductor switch.

3. The power supply control circuit according to claim 2, wherein a protective element is provided in an upstream stage of the second load.

4. The power supply control circuit according to claim 1, wherein an interrupter circuit is connected between the first battery and the first circuit and between the first battery and the second circuit to cut off power supplied from the first battery when the first battery fails.

5. The power supply control circuit according to claim 1, wherein the first terminal of the DC/DC converter is electrically in series with the second terminal of the DC/DC converter.

6. The power supply control circuit according to claim 1, wherein the power supply control circuit is configured to:
provide electricity from the first battery to the first load via, of the first semiconductor switch and the second semiconductor switch, only the second semiconductor switch, and
provide electricity from the second battery to the first load via, of the first semiconductor switch and the second semiconductor switch, only the first semiconductor switch.

* * * * *